US010681166B2

(12) United States Patent
Foerster et al.

(10) Patent No.: US 10,681,166 B2
(45) Date of Patent: Jun. 9, 2020

(54) NETWORK CODING IN AN INFORMATION CENTRIC NETWORK

(71) Applicant: Intel Corporation, Santa Clara, CA (US)

(72) Inventors: Jeffery R Foerster, Portland, OR (US); Srikathyayani Srikanteswara, Portland, OR (US); Hassnaa Moustafa, Portland, OR (US); Vallabhajosyula S. Somayazulu, Portland, OR (US); Nageen Himayat, Fremont, CA (US); Eve M. Schooler, Portola Valley, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 15/487,688

(22) Filed: Apr. 14, 2017

(65) Prior Publication Data

US 2018/0146060 A1 May 24, 2018

Related U.S. Application Data

(60) Provisional application No. 62/424,985, filed on Nov. 21, 2016.

(51) Int. Cl.
*H04L 29/08* (2006.01)
*G06F 16/23* (2019.01)
(Continued)

(52) U.S. Cl.
CPC .......... *H04L 67/2842* (2013.01); *G06F 16/23* (2019.01); *G06F 16/9574* (2019.01);
(Continued)

(58) Field of Classification Search
CPC ..... H04L 67/2842; H04L 69/22; H04L 67/42; H04L 67/327; H04L 67/2876;
(Continued)

(56) References Cited

U.S. PATENT DOCUMENTS 9,374,304 B2 * 6/2016 Solis ..................... H04L 45/742
9,590,948 B2 * 3/2017 Mosko ................ H04L 61/3005
(Continued)

OTHER PUBLICATIONS

"Extensible Authentication Protocol Method for 3rd Generation Authentication and Key Agreement (EAP-AKA)", https://tools.ietf.org/html/rfc4187 Accessed on Feb. 13, 2018, (Jan. 2006), 80 pgs.
(Continued)

*Primary Examiner* — Vivek Srivastava
*Assistant Examiner* — Binod J Kunwar
(74) *Attorney, Agent, or Firm* — Schwegman Lundberg & Woessner, P.A.

(57) ABSTRACT

System and techniques for network coding in an information centric network (ICN) are described herein. A request for a first portion of first named data may be received. A response to the request for the first portion of the first named data may be obtained. The first portion may be combined with a second portion for second named data to create a set of network coded responses. Names for members of the set of network coded responses may be created based on a first name for the first portion and a second name for the second portion. A response to the request may be made with the set of network coded responses using the names for members of the set of network coded responses.

24 Claims, 4 Drawing Sheets

(51) Int. Cl.

| | | |
|---|---|---|
| *H04L 12/24* | (2006.01) | |
| *G06F 16/957* | (2019.01) | |
| *H04L 12/26* | (2006.01) | |
| *H04L 29/06* | (2006.01) | |
| *H04L 12/841* | (2013.01) | |
| *H04L 12/773* | (2013.01) | |
| *H04L 12/741* | (2013.01) | |
| *H04L 12/813* | (2013.01) | |
| *H04L 29/12* | (2006.01) | |
| *H04L 12/721* | (2013.01) | |
| *H04L 12/911* | (2013.01) | |
| *H04L 12/715* | (2013.01) | |

(52) U.S. Cl.
CPC .......... *H04L 29/08* (2013.01); *H04L 41/5006* (2013.01); *H04L 41/5009* (2013.01); *H04L 41/5025* (2013.01); *H04L 41/5035* (2013.01); *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01); *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(58) Field of Classification Search
CPC ..... H04L 67/16; H04L 67/12; H04L 67/1097; H04L 67/10; H04L 61/2076; H04L 47/783; H04L 47/286; H04L 47/20; H04L 45/74; H04L 45/60; H04L 45/14; H04L 45/04; H04L 43/16; H04L 43/12; H04L 41/5035; H04L 41/5025; H04L 41/5009; H04L 41/5006; H04L 29/08; G06F 17/30902; G06F 17/30345
USPC ....................................................... 709/213
See application file for complete search history.

(56) References Cited

U.S. PATENT DOCUMENTS

| | | | |
|---|---|---|---|
| 9,836,540 B2* | 12/2017 | Mosko | H04L 45/742 |
| 10,027,578 B2* | 7/2018 | Wood | H04L 41/024 |
| 2012/0290696 A1* | 11/2012 | Wu | G06F 16/13 |
| | | | 709/223 |
| 2013/0151584 A1* | 6/2013 | Westphal | H04L 67/06 |
| | | | 709/202 |
| 2013/0182568 A1* | 7/2013 | Lee | H04L 47/127 |
| | | | 370/231 |
| 2013/0219081 A1* | 8/2013 | Qian | H04L 67/327 |
| | | | 709/241 |
| 2013/0339481 A1* | 12/2013 | Hong | H04L 67/16 |
| | | | 709/217 |
| 2015/0222479 A1* | 8/2015 | Kim | H04W 28/0236 |
| | | | 370/218 |
| 2015/0281083 A1* | 10/2015 | Kim | H04L 45/7457 |
| | | | 370/235 |
| 2016/0021172 A1* | 1/2016 | Mahadevan | G06F 16/285 |
| | | | 709/204 |
| 2016/0065685 A1* | 3/2016 | Kurihara | H04L 1/08 |
| | | | 714/748 |
| 2016/0087876 A1* | 3/2016 | Fan | H04L 67/32 |
| | | | 709/242 |
| 2016/0105394 A1* | 4/2016 | Rangarajan | H04L 61/302 |
| | | | 709/223 |
| 2016/0118234 A1* | 4/2016 | Covey | G01N 27/624 |
| | | | 250/282 |
| 2016/0212066 A1* | 7/2016 | Ravindran | H04L 47/80 |
| 2016/0241669 A1* | 8/2016 | Royon | H04L 67/2847 |
| 2017/0093710 A1* | 3/2017 | Garcia-Luna-Aceves | |
| | | | H04L 45/74 |
| 2017/0134276 A1* | 5/2017 | White | H04L 45/742 |
| 2017/0257444 A1* | 9/2017 | Wood | H04L 43/0876 |
| 2017/0302631 A1* | 10/2017 | Wood | H04L 45/306 |

OTHER PUBLICATIONS

"802.1x Authentication Chapter 9", Arubanetworks, http://www.arubanetworks.com/techdocs/ArubaOS_60/UserGuide/802.1x.php Accessed on Feb. 13, 2018, 32 pgs.

Chou, Philip A, "Practical Network Coding", Allerton Conference, (2003), 10 pgs.

* cited by examiner

| ADJACENT CACHING TABLE | |
|---|---|
| NAME | LOCATION |
| /ORG1/DATA1/CHUNK1 | CR1/DEVICE1 |
| /ORG1/DATA1/CHUNK2 | CR1 |

| CONTENT STORE (CS) | |
|---|---|
| NAME | DATA |
| /ORG1/DATA1/CHUNK4 | [01001111 01001011] |

NETWORK CODING IN AN INFORMATION CENTRIC NETWORK

CLAIM OF PRIORITY

This patent application claims the benefit of priority, under 35 U.S.C. § 119, to U.S. Provisional Application Ser. No. 62/424,985, titled "INFORMATION-CENTRIC NETWORKING METHODS AND APPARATUSES" and filed on Nov. 21, 2016, the entirety of which is hereby incorporated by reference herein.

TECHNICAL FIELD

Embodiments described herein generally relate to computer network communication and more specifically to network coding in an information centric network (ICN).

BACKGROUND

Network coding is a technique whereby individual data packets are combined during transit from a producer (e.g., content provider, web site, server, etc.) to a consumer (e.g., requesting device, end point device, etc.). Generally, multiple packets are used to create a new packet set (e.g., stream), where members of the new packet set are linear combinations of the multiple input packets. Details of the network coding are proliferated with the new packet set allowing downstream network equipment (e.g., routers, switches, hubs, etc.) to reconstruct the original input packets from the new packet set through decoding.

The complexity introduced by network coding and overhead in signaling the network coding used result in a cost that is generally weighed against the benefit. However, network coding may provide network benefits by allowing for a more efficient network utilization in scenarios where multiple producers are providing data to multiple consumers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

With the explosion in the number of wireless and Internet of Things (IoT) edge devices and their ability to continuously measure and monitor, producing data for emote consumers all the while, a dramatic increase in the network traffic (upstream and downstream) is expected at the network edge. ICN might alleviate some of the traffic to the core network via the distributed caching described below, but ICN may also generates an excessive messaging at the network edge. What is needed are techniques to reduce the amount of data transfer and communication at network edge nodes and optimize (e.g., minimize) the amount of data cached at ICN nodes.

ICNs operate differently than traditional host based communication networks. ICN is an umbrella term for a new networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine, and does not use addresses. Instead, to get content, a device requests named content from the network itself. The content request may be called an interest and transmitted via an interest packet. As the interest packet traverses network devices (e.g., routers), a record of the interest is kept, for example, in a pending interest table. When a device that has content matching the name in the interest is encountered, that device may send a data packet in response to the interest packet. Typically, the data packet is tracked back through the network to the source by following the traces of the interest left in the network devices.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher, "www.somedomain.com," a sub-category, "videos," and the canonical identification "v8675309." As an interest traverses an ICN, ICN equipment will generally attempt to match the name to a greatest degree. Thus, if an ICN device has a cached item or route for both "www.somedomain.com/videos" and "www.somedomain.com/videos/v8675309," the ICN device will match the later for an interest packet specifying "www.somedomain.com/videos/v8675309." In an example, an expression may be used in matching by the ICN device. For example, the interest packet may specify "www.somedomain.com/videos/v8675*" where "*" is a wildcard. Thus, any cached item or route that includes the data other than the wildcard will be matched. In an example, additional meta-data may be attached to the interest packet, the cached data, or the route, to provide an additional level of matching. For example, the data name may be specified as "www.somedomain.com/videos/v8675309," but also include a version number or timestamp, time range, endorsement, etc. In this example, the interest packet may specify the name and also the version number, or version range, desired. The matching may then locate routes or cached data matching the name and then perform the additional comparison of meta-data or the like to arrive at an ultimate decision as to whether data or a route matches the interest packet for responding to the interest packet or forwarding the interest packet respectively.

ICN has advantages over host-based networking because the data segments are individually named. This permits aggressive caching throughout the network as a network device may provide a data packet in response to an interest as easily as an original author. Accordingly, it is less likely that the same segment of a network will transmit duplicates of the same data requested by different devices. Such an architecture is useful when a network branches from a central information provider to many leaves, such as occurs in many IoT deployments.

Fine grained encryption is another feature of many ICN networks. A typical data packet includes a name for the data that matches the name in the interest packet. Further, the data packet includes the requested data and may include additional information that may, for example, be used to filter similarly named data (e.g., by creation time, expiration time, version, etc.). In order to address malicious entities providing false information under the same name, the data packet may also encrypt its contents with a publisher key or provide a cryptographic hash of the data and the name. Thus, knowing the key (e.g., from a certificate of an expected publisher) allows the recipient to ascertain whether the data is from that publisher. This technique also allows the aggressive caching of the data packets throughout the network because each data packet is self-contained and secure. This is in contrast to many host-based networks that rely on encrypting a connection between two hosts to securely communicate. With connection encryption, the network devices have no access to the data in order to cache the data.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Current ICN work is mostly focused on naming and routing data. This work generally assumes that always caching transient data facilitates routing and allows faster replies to subscriber requests. Also, generally, signaling overhead is ignored (e.g., not considered). Thus, there is room for improvement in current ICN proposals and implementations. Specifically, as described herein, data and signal traffic optimization during transit and optimization of stored information may be achieved via application of network coding to ICNs.

Network coding and data compression for ICN-based networks may be exploited in different ways to enhance reliability of data delivery as well as to reduce signaling overhead. As wireless networks become more and more dense, and as devices support access to the network over different radios or frequency channels, a greater number of edge transmissions, or transmissions generally, use multiple paths from data producers to data consumers. That is, there may be many path options for sending data from the network to the end-device and from the end-device to the network in IoT installations. In addition, ICN network elements already include both processing and storage capabilities to support ICN, which may be exploited to implement a flexible network coding technique to optimize end-to-end reliability or capacity of the network. These techniques may also manage reduction in bandwidth usage generally, and more specifically when transcoding and compression of big data emerging from IoT is used. These techniques may be used for uplink (e.g., from the edge) or downlink (e.g., to the edge) data distributions. Additional details and examples are given below.

Figure 1:
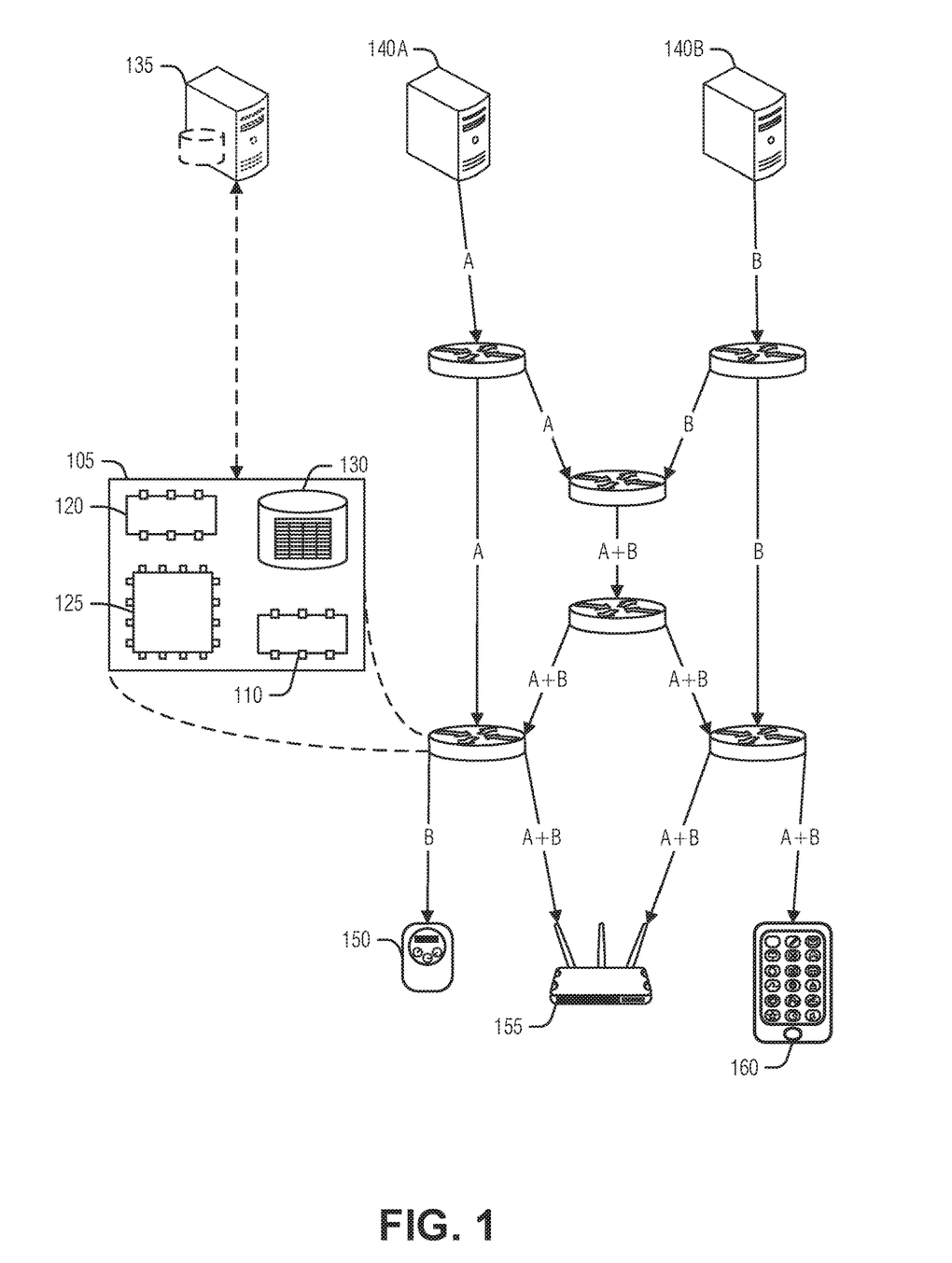
FIG. 1 is a block diagram of an example of an environment including a system for network coding in an ICN, according to an embodiment.

FIG. 1 is a block diagram of an example of an environment 100 including a system 105 for network coding in an ICN, according to an embodiment. The environment 100 includes a butterfly network with data producers 140 (e.g., publisher 140A and server 140B) respectively providing data 'A' and 'B' via ICN nodes to consumers (e.g., gas meter 150, an access point (AP) 155, or tablet 160). As illustrated, and typical of network coding examples, there is a cross-over the network of the data 'A' and 'B' between the producers 140 and consumers. The data is linearly combined in the center of the network to transform 'A' and 'B' into a set of packets 'A+B'.

An ICN network node 105 illustrates an example of network coding in an ICN. The node 105 includes a network interface 110, a controller 125, a data store 130, and an encoder/decoder (encoder) 120. These components of the node 105 are implemented in computer hardware (e.g., circuitry).

The network interface 110 is arranged to receive a request for a first portion of first named data; as noted above, this request may in the form of an interest packet or the like.

The controller 125 is arranged to obtain (e.g., receive or retrieve) a response to the request for the first portion of the first named data. The response may be from another node or may be retrieved from a local cache.

The controller 125 is arranged to combine, via the encoder 120, the first portion with a second portion for second named data to create a set of network coded responses. Thus, here, the first portion of the named data (e.g., data1/chunk1) is obtained in the response and then combined with another data portion—the second portion for second named data (e.g., data2/chunk1)—to create the set of network coded responses. Because network coding may not involve compression, the cardinality of the set of network coded responses (e.g., the number of members in the set) may be equal to or greater than the number of input portions. Thus, combining the first portion and the second portion may result in two or more network coded responses. Network coded responses are represented in FIG. 1 via the A+B notation.

In an example, the request includes a set of portions of the named data already possessed by a requester. Thus, the AP 155 may request 'data1' and already be in possession of data chunks 1-3 and 5 of data1. The controller 125, knowing about the AP's possession of these chunks may inform which portions to include in network coding operations. Thus, in an example, second portion is combined with the first portion based on exclusion from the set of portions of the named data already possessed by the requester. The requester may signal ownership of the data portions in a number of ways. For example, the request may include an exclusion, or in-possession, list. This may be useful if, for example, the requester does not know how many portions there are to the named data but the requester is able to positively identify the portions it has already received. In an example, the node 105 may track which data portions have been previously delivered to the requester and use this record as the exclusion list.

As noted above, named data is an important facet in ICN operations. The combination of multiple data portions into a set of network coded responses also is named to provide ICN nodes (including requesters and responders) with an ability to discern packet contents such that the name-based operations of the ICN are preserved. Thus, the controller 125 is arranged to create names for members of the set of network coded responses based on a first name for the first portion and a second name for the second portion. For example, given two names, 'company.secure/camera1/image1' and 'company.secure/camera2/image4', the created name may be 'company.secure/(camera1/image1), (camera2/image4)' or the like. A variety of name combinations are available as long as the different underlying differences between names of the data portions are discernable (e.g., may be parsed). In an example, the created names maintain a common prefix between a name for the first data and a name for the second data. Thus, as seen above, the two images share a common prefix of 'company.secure'. This is maintained because many routing techniques perform a longest match operation when the named data is not local to determine a next step for routing the request. In an example, the names created for the members of the set of network coded responses explicitly include an identifier that indicates a network coded response. Otherwise, the network coded nature may be inferred from name combination semantics (e.g., presence of a comma used as a data portion delimiter). In an example, each name created for the members of the set of network coded responses include a respective identifier for each portion used to make a corresponding member. This example addresses the ability to reconstruct a single packet, for example, from the possible multiple network coded packets produced during combination with other data.

After the controller's work is complete in creating the set of network encoded responses and creating names for members of the network coded responses, the controller 125 is arranged to respond to the request, via the network interface 110, with the set of network coded responses using the names for members of the set of network coded responses. Thus, the requester receives a network coded packets in response to the original request. Because of the created names, downstream ICN nodes, including the requester, may then reverse the combination process on the network coded responses to reconstruct the original data portion corresponding to the original request.

In an example, the request includes a network coding field. Here, combining the first portion with the second portion, creating the names for member of the set of network coded messages, and responding to the request with the set of network coded messages are performed in response to the network coding field. Thus, in this example, the requester specifically requests a network coded version of the response. This may be useful, for example, where the requester is aware of multiple consumers of the data, a use case in which network coding is shown to improve network utilization efficiency.

In an example, the controller 125 may be arranged to store the set of network coded responses in a local cache (e.g., in data store 130) indexed by the names for the members of the set of network coded responses. Again, this may improve efficiency when the network coded responses include broadcast, or other multicast data from multiple providers 140 for consumption by consumers (e.g., multiple consumers 150, 155, or 160).

In an example, the controller 125 is arranged to maintain an adjacent cache record of cache contents for adjacent nodes. The adjacent cache record allows the node 105 to know which other nodes hold pieces of data that may be used to satisfy requests. This knowledge may lead to a more efficient network coding decisions. For example, given nodes A, B, and C, if A is aware of B's contents and receives a request from C for data x on A and y on B, then A is aware of being able to network encode x+y before B answers the request to C.

Maintaining the adjacent cache record (e.g., adjacent cache table (ACT)), may provide ancillary benefits as well. For example, a local cache record may include a reference (e.g., pointer) to an adjacent node holding the data. Thus, the local cache may maintain aspects of the named data without expending resources to store the data itself. Thus, in an example, the adjacent cache record is maintained in a local cache by replacing cache contents corresponding to an index with a remote reference to the adjacent node. In an example, the remote reference includes a number of network hops to the adjacent network node. That is, the remote reference indicates whether the remote data is one network node away (e.g., directly connected), two nodes away, etc. In an example, the adjacent cache record includes a time-to-live (TTL) value for each record. TTLs provide a good way to expire data while reducing signaling overhead from constantly polling whether the data is still good.

In an example, the adjacent nodes include an end-point requester. In an example, the adjacent nodes include an end-point responder. Being able to leverage the adjacent cache record to include endpoints permits better networking coding decisions. Because of the network coding overhead mentioned above, network coding provides benefits when the network utilization surpasses the networking coding overhead. This scenario is present, for example, in the butterfly network illustrated in FIG. 1. With network coding, the B data from provider 140B would cross over the A data to reach the tablet 160. Thus, without network coding, the tablet 160, may have to wait until the A data passes the cross-over point before receiving the B data, or vice-versa. In contrast, when the network knows that tablet 160 will receive both A and B data, then network coding permits the simultaneous delivery of both data streams without impeding, for example, the B data from reaching the gas meter 150. If, however, the tablet 160 only wanted B data and the gas meter 150 only wanted A data (and the AP 155 were ignored), then there is no benefit to combining A and B. In an example, the first portion is combined with the second portion in response to a metric determined from the adjacent cache record. In an example, the metric is a compression efficiency. In an example, the metric is an estimated network efficiency.

In an example, the adjacent cache record is maintained in a local adjacent cache table that is distinct from a local cache for information centric network data. In an example, the local adjacent cache table includes a name and a location to an adjacent node with data corresponding to the name. In an example, to maintain the adjacent cache record, the node 105 (e.g., the controller 125) subscribes to an adjacent cache service of adjacent nodes and updates the adjacent cache record with responses to the subscribing. In an example, the node subscribes to a regional data manager 135. The regional data manager 135 maintains data locations (e.g., via reference tables) to several ICN nodes. These examples illustrate an explicit adjacent cache record maintenance where information about adjacent nodes is explicitly requested by the node 105.

In an example, to maintain the adjacent cache record, the node 105 (e.g., the controller 125) is arranged to parse a request of a combination of named data portions to identify a first named data portion that is new and a second named data portion that is old and update the adjacent cache record to reference the second named data portion and point to a node that sent the request. In an example, to maintain the adjacent cache record, the node 105 is arranged to update the adjacent cache record to reference the first named data portion and point to a node that responded to the request with data. These examples illustrate an implicit adjacent cache record maintenance where the flow of data through the node 105 is used to populate the adjacent cached record.

The following examples provide additional embodiments and explanations to the environment 100 and node 105 described above.

Fully distributed network coding operations in a network are available by spending the encoding (e.g., linear combinations) applied to each packet as part of the packet header. This may be done in addition to identifying the packet and its associated generation or version. Encoding and packet identification facilitate ICN network coding because the encoding is directly reflected in the data naming or in attributes of the network coded packet. For example, let the names of two images from a surveillance camera be:

/security_company/Portland/ABCMall/store1/camera1/image1

/security_company/Portland/ABCMall/store1/camera1/image2 and the XOR (e.g., linear combination) of image1 and image2 may be named:

/security_company/Portland/ABCMall/store1/camera1/NC,image1,image2

Attributes or metadata of the packet may indicate the linear combination of the two components as "image1 XOR image2." Similarly, in a flat naming scheme, the name may be appended with a unique phrase to indicate network coded data, such as ABCMallStore1camera1image1image2NC. Again the metadata can contain the linear combination of the components in the data.

Figure 2:
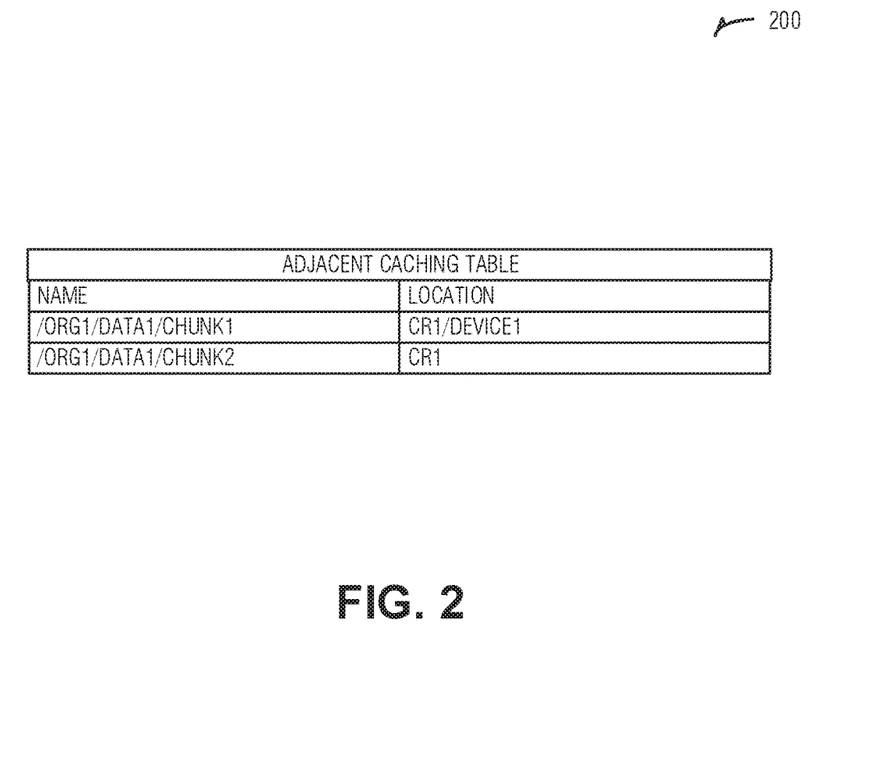
FIG. 2 illustrates an example of an adjacent caching table, according to an embodiment.
Figure 3:
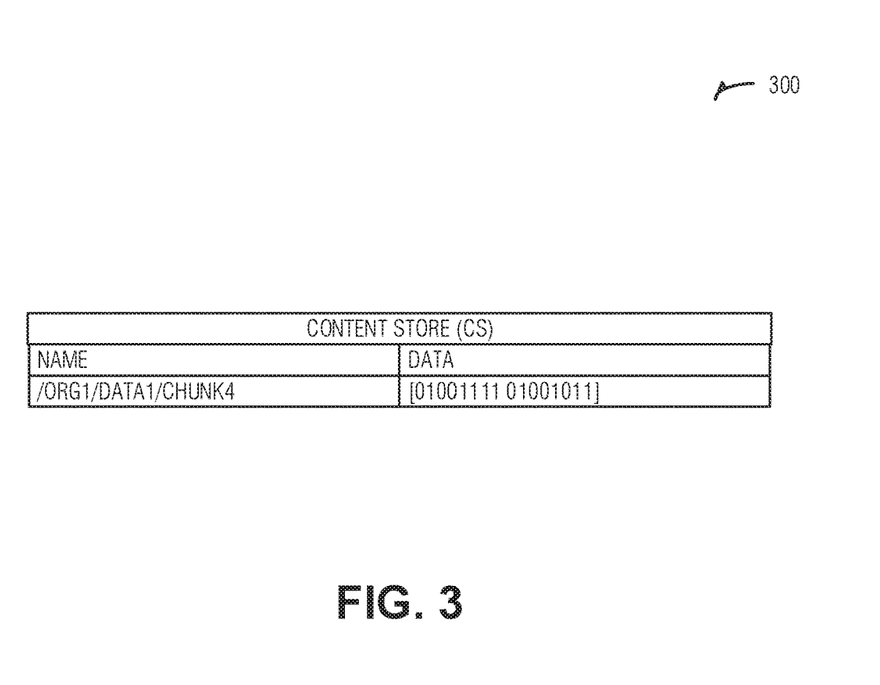
FIG. 3 illustrates an example of a content store, according to an embodiment.

FIG. 2 illustrates an example of an adjacent caching table (ACT) 200, according to an embodiment and FIG. 3 illustrates an example of a content store (CS) 300, according to an embodiment. As noted above, in an example, these tables 200 and 300 may be combined into a single tabular data structure (e.g., the CS 300 table is modified to include a location field from the ACT 200). Current ICN networks that use the publish-subscribe model and a local forwarding table may be modified to include the ACT 200 to track information cached by adjacent networked nodes. This tracking may be used to govern data compression strategies (e.g., during caching or transfer) or to govern network coding during data transfer. The ACT 200 along with the CS 300—which typically has content details of the local cache—may be used to create the network coding. In an example, the ACT 200 may record a location of the data (e.g., at which node) based on its relative position (e.g., how many network hops and at which route from the node with the ACT 200 and the data). In an example, a distance from the ACT 200 node to the data may be used as a filter to screen which nodes to use for network coding. In an example, the domain of ACT tracking is general in that it may also track the cached contents of the data requestors (e.g., end devices, endpoints, etc.).

ACT 200 creation and maintenance may be implemented in a number of ways. In an example, new messages may be used to allow adjacent nodes to share their cached information. In an example, the new messages may be directed to a regional data manager that maintains data state for a region of ICN nodes. For example, each node that maintains an ACT 200 may publish the availability of a cache content service and nodes who are interested may subscribe to this service. The regional data manager may then subscribe to multiple nodes' cache content service and maintain a listing of cache contents. Other nodes, instead of subscribing directly to the service, may then subscribe to the regional data manager. In an example, network coding may be performed during transmission of ACT data through the new messages. This approach causes the transmission ACT information to be on-demand and allows co-existence of ACT enabled nodes with other nodes.

In an example, adjacent cache information may be included in (e.g., piggyback on) interest packets for new content requests. For example, when interest packets are sent to adjacent networked nodes, the interest packet may include a request for network coded data, if possible. These requests may also include a multipath designation such that the responses are network coded and sent along the multiple paths requested. This scenario may be useful for endpoint nodes, such as the AP 155 from FIG. 1, that include multiple connections to the network.

In an example, the request may include a field in the name that indicates "new data." Here, the "new data" value of the field indicates a combination of existing data that may or may not have an existing name. To implement this example, representing a linear combinations of data may include a standardized naming scheme or an indication in the name, to signal that the data is network coded data. In an example, the data field has a description of exactly' what combinations of non-network coded data make up the network coded data. Thus, when nodes receive interest packet requests from multiple interfaces (e.g., different wireless or wired connections), the nodes may then use network coding of multiple chunks of data (e.g., files)—which could be a simple independent linear combination of the chunks)—and then forward these network coded packets through the multiple paths identified. In an example, the data header may be flagged to indicate the network code applied. In an example, the network code applied may be shared in a different channel (e.g., initial packets, control channel, or other side band channel). In an example, the different channel may include an attributes field of the data packet. In this example, existing attribute based routing mechanisms may be applied to propagate network coded packets or to further encode the packets.

In an example, the decision to route the interest or the data (e.g., content) packets across multiple paths may be done in a distributed fashion on the promise of "innovation" to be expected from such routing via inspection of the ACT information. Here, innovation refers to the amount of new information. Thus, if a particular path is missing data A, A may be routed through that path in order to seed the path (and the nodes thereon) with the innovative (e.g., new) data A. For wireless networks, the "first/last hop" routing decision may be very inexpensive as the broadcast nature of the wireless medium may be used to disseminate interest/data packets to multiple nodes that may use an eavesdropping mechanisms (e.g., the packet is not directly addressed to the node) to populate local caching tables.

In an example, the adjacent cache information may be included in data packets sent in response to requests (in packet used to deliver new content to a node). This operates in a manner similar to the interest packet discussion above. In an example, the dissemination of ACT information may be scoped through the use of multicast with TTLs.

As noted above, the benefit of ICNs include the distributed caching of data. In an example, information may be stored in network coded form in distributed caches (as linear combinations of information chunks) for improved reliability and latency as well as for load balancing across different servers/nodes. Thus, while nodes may constantly encode and decode data such that the local cache maintains only uuencoded data chunks, here the encoded chunks are actually cached. When a subscriber requests information in a network-coded ICN, multiple publishers may be enabled to provide independent linear combinations in parallel to respond to the request. This may improve latency and may also help improve throughput, in addition to enabling multicast. To implement such network-coded information access in ICN, linear combinations in the ICN naming of information chunks are indexed so individual nodes may access any specific combinations they are missing and recover the data. This technique may benefit the reverse content data network (CDN) scenarios in which the data is generated at an end-point (e.g., security camera) and consumed by many in-network devices (e.g., servers), or when a subscriber requests information from a number of distributed sources. Here, again, network coding may be enabled in the ICN by a naming convention that identifies different, unique combinations of information chunks.

For example, if source node A has two chunks of data cached in a network coded form, and consumer node B sends a request for only one of the chucks, or a piece of the chunk, the naming of network coded content allows node A to determine whether the desired packet is one of the constituents of the network coded packet that it A has cached. If multiple sources (e.g., nodes A and X) receive the same request from node B for a particular packet or a chunk of data that both sources have available in network coded form, the request is resolved between source nodes A and X to avoid the problem of multiple responses to the request. The resolution may include a two-phase process for name resolution: the consumer requests the information; multiple sources respond with matching names of network coded combinations which contain that information (phase one); the consumer determines which information contains the most innovation (e.g., would deliver most new data upon decoding) and sends a particular request for that combination (phase 2). The overhead of additional transactions may be repaid with better throughput for the actual data.

In an example, for a case where the source node is trying to simultaneously address multiple consumer requests (e.g., a broadcast or multi-cast of coded packets), the source node may optimize its transmission such that a single network coded transmission provides the most innovation for several consumers. Here, an approach to facilitate such operation includes the requesting devices to periodically (or upon request) update their interest (e.g., issue a new interest packet) in the requested content. This update includes a snapshot of the encoded packets the requesting device has already received or indicates a minimal number of combinations required to decode the packet. The forwarding nodes may then optimize the encoding or packet forwarding function to deliver the most innovation.

In an example, to save overhead and allow the coexistence of network coding capable nodes and nodes that do not provide network coding, may involve: the network coding takes place on the source node side for caching; when the consumer node sends a request for a specific packet or chunk in the coded block, the source node will do decoding in a temp caching space and send the consumer node only the information requested; and then the source node deletes the decoded block after sending the data to the consumer node.

In an example, for improved compression efficiency, nodes may compare data packet to be forwarded to a next node with cached information to determine if any compression gains may be achieved. Some additional storage capacity may be used to keep track of adjacent network node caches, however, each node does not need to store each adjacent nodes cache. Rather, a node may store pointers or names of data chunks if a semantically rich naming approach is applied because the names may indicate the data content and the data chunk to adjacent nodes data which correlates well with the local cache.

In an example, for uplink transmission in a wireless network (e.g., edge-to-center), the end device (e.g., node) may choose to deliver data over multiple wireless links and network code the data for improved robustness or efficiency. Further, if the end device has information about what content is stored at the network node (e.g., given a recent download), then the end device may use that information to compress the data transmission in addition to network coding the delta between the network nodes' cached content and the new data. For example, this scenario may apply to a local IoT gateway sending IoT data (e.g., collected from sensors) to several hierarchal gateways. The same data may be traveling to these different gateways because different IoT services are requesting the data. Here, network coding optimizes transmission and also bandwidth usage across the network. In another example, for downlink transmission, network coding is efficient when doing software or firmware updates for several IoT devices at the same time, as well as V2X or autonomous driving map updates.

Figure 4:
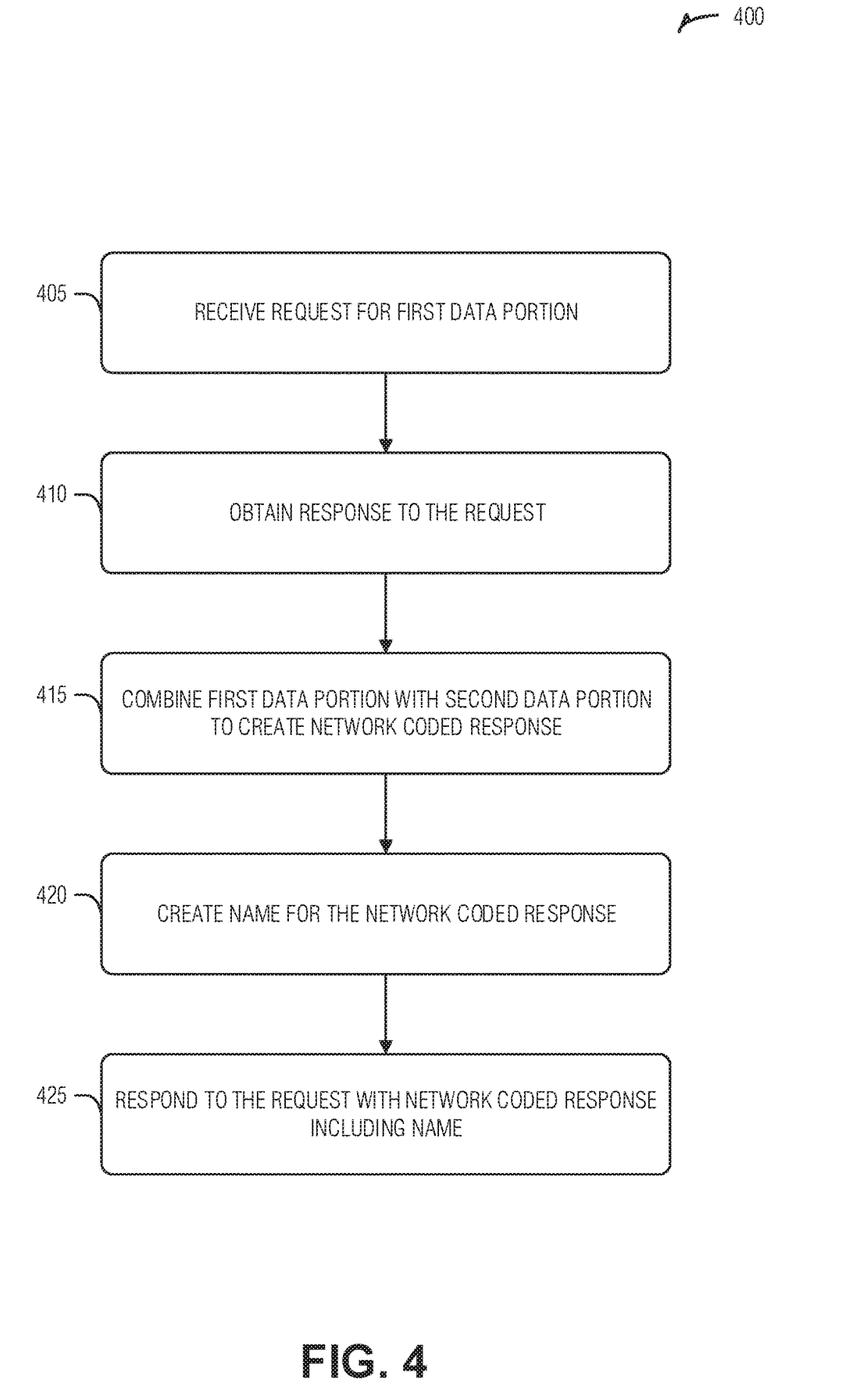
FIG. 4 illustrates a flow diagram of an example of a method for network coding in an ICN, according to an embodiment.

FIG. 4 illustrates a flow diagram of an example of a method 400 for network coding in an ICN, according to an embodiment. The operations of the method 400 are performed by computer hardware, such as that described above, or described below with respect to FIG. 5 (e.g., circuitry).

At operation 405, a request for a first portion of first named data is received.

At operation 410, a response to the request for the first portion of the first named data is obtained.

At operation 415, the first portion is combined with a second portion for second named data to create a set of network coded responses. In an example, the request includes a set of portions of the named data already possessed by a requester. In an example, the second portion is combined with the first portion based on exclusion from the set of portions of the named data already possessed by the requester.

At operation 420, names for members of the set of network coded responses are created based on a first name for first portion and a second name for the second portion, in an example, the names created for the members of the set of network coded responses explicitly include an identifier that indicates a network coded response. In an example, each name created for the members of the set of network coded responses include a respective identifier for each portion used to make a corresponding member.

At operation 425, a response is made to the request with the set of network coded responses using the names for members of the set of network coded responses.

In an example, the request includes a network coding field, and combining the first portion with the second portion, creating the named for member of the set of network coded messages, and responding to the request with the set of network coded messages are performed in response to the network coding field.

In an example, the method 400 further includes an operation of storing the set of network coded responses in a local cache indexed by the names for the members of the set of network coded responses. In an example, the method 400 further includes an operation of maintaining an adjacent cache record of cache contents for adjacent nodes. In an example, the adjacent cache record is maintained in a local cache by replacing cache contents corresponding to an index with a remote reference to the adjacent node. In an example, the remote reference includes a number of network hops to the adjacent network node. In an example, the adjacent cache record includes a time-to-live value for each record. In an example, the adjacent nodes include an end-point requester. In an example, the adjacent nodes include an end-point responder.

In an example, the adjacent cache record is maintained in a local adjacent cache table that is distinct from a local cache for information centric network data. In an example, the local adjacent cache table includes a name and a location to an adjacent node with data corresponding to the name. In an example, maintaining the adjacent cache record includes subscribing to an adjacent cache service of adjacent nodes and updating the adjacent cache record with responses to the subscribing. In an example, maintaining the adjacent cache record includes parsing a request of a combination of named data portions to identify a first named data portion that is new and a second named data portion that is old and updating the adjacent cache record to reference the second named data portion and point to a node that sent the request. In an example, maintaining the adjacent cache record includes updating the adjacent cache record to reference the first named data portion and point to a node that responded to the request with data.

In an example, the first portion is combined with the second portion in response to a metric determined from the adjacent cache record. In an example, the metric is a compression efficiency. In an example, the metric is an estimated network efficiency.

Figure 5:
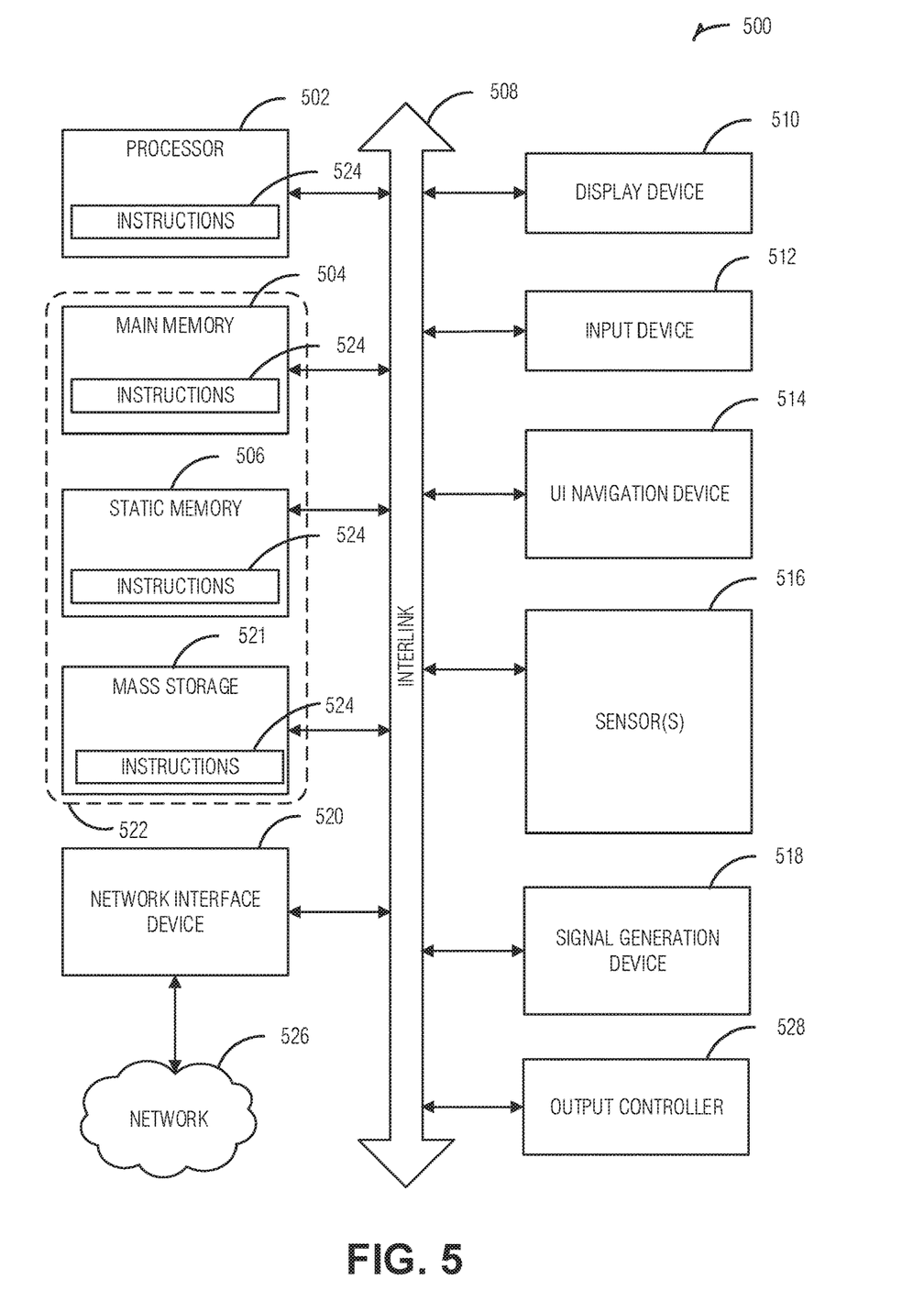
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic input-output (BIOS), unified extensible firmware interface (UEFI), etc.) 506, and mass storage 521 (e.g., hard drive, tape drive, flash storage, or other block devices) some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 521 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 521 during execution thereof by the machine 500. In an example, one or any combination of the hardware processor 502, the main memory 504, the static memory 506, or the mass storage 521 may constitute the machine readable media 502. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (WEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a system for network coding in an information centric network, the system comprising: a network interface to: receive a request for a first portion of first named data; and obtain a response to the request for the first portion of the first named data; an encoder to combine the first portion with a second portion for second named data to create a set of network coded responses; and a controller to: create names for members of the set of network coded responses based on a first name for the first portion and a second name for the second portion; and respond to the request with the set of network coded responses using the names for members of the set of network coded responses.

In Example 2, the subject matter of Example 1 optionally includes wherein the request includes a network coding field, and wherein combining the first portion with the second portion, creating the names for member of the set of network coded messages, and responding to the request with the set of network coded messages are performed in response to the network coding field.

In Example 3, the subject matter of any one or more of Examples 1-2 optionally include wherein the request includes a set of portions of the named data already possessed by a requester, and wherein the second portion is combined with the first portion based on exclusion from the set of portions of the named data already possessed by the requester.

In Example 4, the subject matter of any one or more of Examples 1-3 optionally include wherein the names created for the members of the set of network coded responses explicitly include an identifier that indicates a network coded response.

In Example 5, the subject matter of any one or more of Examples 1-4 optionally include wherein each name created for the members of the set of network coded responses include a respective identifier for each portion used to make a corresponding member.

In Example 6, the subject matter of any one or more of Examples 1-5 optionally include wherein the controller is to store the set of network coded responses in a local cache indexed by the names for the members of the set of network coded responses.

In Example 7, the subject matter of any one or more of Examples 1-6 optionally include wherein the controller is to maintain an adjacent cache record of cache contents for adjacent nodes.

In Example 8, the subject matter of Example 7 optionally includes wherein the adjacent cache record is maintained in a local cache by replacing cache contents corresponding to an index with a remote reference to the adjacent node.

In Example 9, the subject matter of Example 8 optionally includes wherein the remote reference includes a number of network hops to the adjacent network node.

In Example 10, the subject matter of any one or more of Examples 7-9 optionally include wherein the adjacent cache record is maintained in a local adjacent cache table that is distinct from a local cache for information centric network data, the local adjacent cache table including a name and a location to an adjacent node with data corresponding to the name.

In Example 11, the subject matter of any one or more of Examples 7-10 optionally include wherein, to maintain the adjacent cache record, the controller is to: subscribe to an adjacent cache service of adjacent nodes; and update the adjacent cache record with responses to the subscribing.

In Example 12, the subject matter of any one or more of Examples 7-11 optionally include wherein, to maintain the adjacent cache record, the controller is to: parse a request of a combination of named data portions to identify a first named data portion that is new and a second named data portion that is old; and update the adjacent cache record to include: a reference to the second named data portion; and a pointer to a node that sent the request.

In Example 13, the subject matter of Example 12 optionally includes wherein, to maintain the adjacent cache record, the controller is to update the adjacent cache record to include: a reference to the first named data portion; and a pointer to a node that responded to the request with data.

In Example 14, the subject matter of any one or more of Examples 7-13 optionally include wherein the adjacent cache record includes a time-to-live value for each record.

In Example 15, the subject matter of any one or more of Examples 7-14 optionally include wherein the adjacent nodes include an end-point requester.

In Example 16, the subject matter of any one or more of Examples 7-15 optionally include wherein the adjacent nodes include an end-point responder.

In Example 17, the subject matter of any one or more of Examples 7-16 optionally include wherein the first portion is combined with the second portion in response to a metric determined from the adjacent cache record.

In Example 18, the subject matter of Example 17 optionally includes wherein the metric is a compression efficiency.

In Example 19, the subject matter of any one or more of Examples 17-18 optionally include wherein the metric is an estimated network efficiency.

Example 20 is a method for network coding in an information centric network, the method comprising: receiving a request for a first portion of first named data; obtaining a response to the request for the first portion of the first named data; combining the first portion with a second portion for second named data to create a set of network coded responses; creating names for members of the set of network coded responses based on a first name for the first portion and a second name for the second portion; and responding to the request with the set of network coded responses using the names for members of the set of network coded responses.

In Example 21, the subject matter of Example 20 optionally includes wherein the request includes a network coding field, and wherein combining the first portion with the second portion, creating the names for member of the set of network coded messages, and responding to the request with the set of network coded messages are performed in response to the network coding field.

In Example 22, the subject matter of any one or more of Examples 20-21 optionally include wherein the request includes a set of portions of the named data already possessed by a requester, and wherein the second portion is combined with the first portion based on exclusion from the set of portions of the named data already possessed by the requester.

In Example 23, the subject matter of any one or more of Examples 20-22 optionally include wherein the names created for the members of the set of network coded responses explicitly include an identifier that indicates a network coded response.

In Example 24, the subject matter of any one or more of Examples 20-23 optionally include wherein each name created for the members of the set of network coded responses include a respective identifier for each portion used to make a corresponding member.

In Example 25, the subject matter of any one or more of Examples 20-24 optionally include storing the set of network coded responses in a local cache indexed by the names for the members of the set of network coded responses.

In Example 26, the subject matter of any one or more of Examples 20-25 optionally include maintaining an adjacent cache record of cache contents for adjacent nodes.

In Example 27, the subject matter of Example 26 optionally includes wherein the adjacent cache record is maintained in a local cache by replacing cache contents corresponding to an index with a remote reference to the adjacent node.

In Example 28, the subject matter of Example 27 optionally includes wherein the remote reference includes a number of network hops to the adjacent network node.

In Example 29, the subject matter of any one or more of Examples 26-28 optionally include wherein the adjacent cache record is maintained in a local adjacent cache table that is distinct from a local cache for information centric network data, the local adjacent cache table including a name and a location to an adjacent node with data corresponding to the name.

In Example 30, the subject matter of any one or more of Examples 26-29 optionally include wherein maintaining the adjacent cache record includes: subscribing to an adjacent cache service of adjacent nodes; and updating the adjacent cache record with responses to the subscribing.

In Example 31, the subject matter of any one or more of Examples 26-30 optionally include wherein maintaining the adjacent cache record includes: parsing a request of a combination of named data portions to identify a first named data portion that is new and a second named data portion that is old; and updating the adjacent cache record to include: a reference to the second named data portion; and a pointer to a node that sent the request.

In Example 32, the subject matter of Example 31 optionally includes wherein maintaining the adjacent cache record includes updating the adjacent cache record to include: a reference to the first named data portion; and a pointer to a node that responded to the request with data.

In Example 33, the subject matter of any one or more of Examples 26-32 optionally include wherein the adjacent cache record includes a time-to-live value for each record.

in Example 34, the subject matter of any one or more of Examples 26-33 optionally include wherein the adjacent nodes include an end-point requester.

In Example 35, the subject matter of any one or more of Examples 26-34 optionally include wherein the adjacent nodes include an end-point responder.

In Example 36, the subject matter of any one or more of Examples 26-35 optionally include wherein the first portion is combined with the second portion in response to a metric determined from the adjacent cache record.

In Example 37, the subject matter of Example 36 optionally includes wherein the metric is a compression efficiency.

In Example 38, the subject matter of any one or more of Examples 36-37 optionally include wherein the metric is an estimated network efficiency.

Example 39 is at least one machine readable medium including instructions that, when executed by processing circuitry, cause the processing circuitry to implement any method of Examples 20-19.

Example 40 is a machine including means to implement any method of Examples 20-19.

Example 41 is at least one machine readable medium including instructions for network coding in an information centric network, the instructions, when executed by processing circuitry, cause the processing circuitry to perform operations comprising: receiving a request for a first portion of first named data; obtaining a response to the request for the first portion of the first named data; combining the first portion with a second portion for second named data to create a set of network coded responses; creating names for members of the set of network coded responses based on a first name for the first portion and a second name for the second portion; and responding to the request with the set of network coded responses using the names for members of the set of network coded responses.

In Example 42, the subject matter of Example 41 optionally includes wherein the request includes a network coding field, and wherein combining the first portion with the second portion, creating the names for member of the set of network coded messages, and responding to the request with the set of network coded messages are performed in response to the network coding field.

In Example 43, the subject matter of any one or more of Examples 41-42 optionally include wherein the request includes a set of portions of the named data already possessed by a requester, and wherein the second portion is combined with the first portion based on exclusion from the set of portions of the named data already possessed by the requester.

In Example 44, the subject matter of any one or more of Examples 41-43 optionally include wherein the names created for the members of the set of network coded responses explicitly include an identifier that indicates a network coded response.

In Example 45, the subject matter of any one or more of Examples 41-44 optionally include wherein each name created for the members of the set of network coded responses include a respective identifier for each portion used to make a corresponding member.

In Example 46, the subject matter of any one or more of Examples 41-45 optionally include wherein the operations include storing the set of network coded responses in a local cache indexed by the names for the members of the set of network coded responses.

In Example 47, the subject matter of any one or more of Examples 41-46 optionally include wherein the operations include maintaining an adjacent cache record of cache contents for adjacent nodes.

In Example 48, the subject matter of Example 47 optionally includes wherein the adjacent cache record is maintained in a local cache by replacing cache contents corresponding to an index with a remote reference to the adjacent node.

In Example 49, the subject matter of Example 48 optionally includes wherein the remote reference includes a number of network hops to the adjacent network node.

In Example 50, the subject matter of any one or more of Examples 47-49 optionally include wherein the adjacent cache record is maintained in a local adjacent cache table that is distinct from a local cache for information centric network data, the local adjacent cache table including a name and a location to an adjacent node with data corresponding to the name.

In Example 51, the subject matter of any one or more of Examples 47-50 optionally include wherein maintaining the adjacent cache record includes: subscribing to an adjacent cache service of adjacent nodes; and updating the adjacent cache record with responses to the subscribing.

In Example 52, the subject matter of any one or more of Examples 47-51 optionally include wherein maintaining the adjacent cache record includes: parsing a request of a combination of named data portions to identify a first named data portion that is new and a second named data portion that is old; and updating the adjacent cache record to include: a reference to the second named data portion; and a pointer to a node that sent the request.

In Example 53, the subject matter of Example 52 optionally includes wherein maintaining the adjacent cache record includes updating the adjacent cache record to include: a reference to the first named data portion; and a pointer to a node that responded to the request with data.

In Example 54, the subject matter of any one or more of Examples 47-53 optionally include wherein the adjacent cache record includes a time-to-live value for each record.

In Example 55, the subject matter of any one or more of Examples 47-54 optionally include wherein the adjacent nodes include an end-point requestor.

In Example 56, the subject matter of any one or more of Examples 47-55 optionally include wherein the adjacent nodes include an end-point responder.

In Example 57, the subject matter of any one or more of Examples 47-56 optionally include wherein the first portion is combined with the second portion in response to a metric determined from the adjacent cache record.

In Example 58, the subject matter of Example 57 optionally includes wherein the metric is a compression efficiency.

In Example 59, the subject matter of any one or more of Examples 57-58 optionally include wherein the metric is an estimated network efficiency.

Example 60 is a system for network coding in an information centric network, the system comprising: means for receiving a request for a first portion of first named data; means for obtaining a response to the request for the first portion of the first named data; means for combining the first portion with a second portion for second named data to create a set of network coded responses; means for creating names for members of the set of network coded responses based on a first name for the first portion and a second name for the second portion; and means for responding to the request with the set of network coded responses using the names for members of the set of network coded responses.

in Example 61, the subject matter of Example 60 optionally includes wherein the request includes a network coding field, and wherein combining the first portion with the second portion, creating the names for member of the set of network coded messages, and responding to the request with the set of network coded messages are performed in response to the network coding field.

In Example 62, the subject matter of any one or more of Examples 60-61 optionally include wherein the request includes a set of portions of the named data already possessed by a requester, and wherein the second portion is combined with the first portion based on exclusion from the set of portions of the named data already possessed by the requester.

In Example 63, the subject matter of any one or more of Examples 60-62 optionally include wherein the names created for the members of the set of network coded responses explicitly include an identifier that indicates a network coded response.

In Example 64, the subject matter of any one or more of Examples 60-63 optionally include wherein each name created for the members of the set of network coded responses include a respective identifier for each portion used to make a corresponding member.

In Example 65, the subject matter of any one or more of Examples 60-64 optionally include means for storing the set of network coded responses in a local cache indexed by the names for the members of the set of network coded responses.

in Example 66, the subject matter of any one or more of Examples 60-65 optionally include means for maintaining an adjacent cache record of cache contents for adjacent nodes.

In Example 67, the subject matter of Example 66 optionally includes wherein the adjacent cache record is maintained in a local cache by replacing cache contents corresponding to an index with a remote reference to the adjacent node.

In Example 68, the subject matter of Example 67 optionally includes wherein the remote reference includes a number of network hops to the adjacent network node.

In Example 69, the subject matter of any one or more of Examples 66-68 optionally include wherein the adjacent cache record is maintained in a local adjacent cache table that is distinct from a local cache for information centric network data, the local adjacent cache table including a name and a location to an adjacent node with data corresponding to the name.

In Example 70, the subject matter of any one or more of Examples 66-69 optionally include wherein the means for maintaining the adjacent cache record includes: means for subscribing to an adjacent cache service of adjacent nodes; and means for updating the adjacent cache record with responses to the subscribing.

In Example 71, the subject matter of any one or more of Examples 66-70 optionally include wherein the means for maintaining the adjacent cache record includes: means for parsing a request of a combination of named data portions to identify a first named data portion that is new and a second named data portion that is old; and means for updating the adjacent cache record to include: a reference to the second named data portion; and a pointer to a node that sent the request.

In Example 72, the subject matter of Example 71 optionally includes wherein the means for maintaining the adjacent cache record includes means for updating the adjacent cache record to include: a reference to the first named data portion; and a pointer to a node that responded to the request with data.

In Example 73, the subject matter of any one or more of Examples 66-72 optionally include wherein the adjacent cache record includes a time-to-live value for each record.

In Example 74, the subject matter of any one or more of Examples 66-73 optionally include wherein the adjacent nodes include an end-point requester.

In Example 75, the subject matter of any one or more of Examples 66-74 optionally include wherein the adjacent nodes include an end-point responder.

In Example 76, the subject matter of any one or more of Examples 66-75 optionally include wherein the first portion is combined with the second portion in response to a metric determined from the adjacent cache record.

In Example 77, the subject matter of Example 76 optionally includes wherein the metric is a compression efficiency.

In Example 78, the subject matter of any one or more of Examples 76-77 optionally include wherein the metric is an estimated network efficiency.

Example 79 is at least one machine-readable medium including instructions, which when executed by a machine, cause the machine to perform operations of any of the operations of Examples 1-78.

Example 80 is an apparatus comprising means for performing any of the operations of Examples 1-78.

Example 81 is a system to perform the operations of any of the Examples 1-78.

Example 82 is a method to perform the operations of any of the Examples 1-78.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for network coding in an information centric network, the system comprising:
   a network interface to:
      receive a request for a first portion of first named data; and
      obtain a response to the request for the first portion of the first named data;
   an encoder to combine the first portion with a second portion for second named data to create a set of network coded responses; and
   a controller to:
      create names for members of the set of network coded responses based on a first name for the first portion and a second name for the second portion;
      respond to the request with the set of network coded responses using the names for members of the set of network coded responses; and
      maintain an adjacent cache record of cache contents for adjacent nodes, wherein the adjacent cache record is maintained in a local cache content store (CS) by replacing a CS entry data portion corresponding to an index with a remote reference to the adjacent node, other CS entry data portions containing cached content, wherein the system includes a forwarding table (FT) in addition to the CS, the FT used by the system to select an outbound interface to forward received interest packets that name data not found in the CS;

wherein the first portion is combined with the second portion to create the set of network coded responses in response to a metric determined from the adjacent cache record, the metric being one of estimated network efficiency or compression efficiency.

2. The system of claim 1, wherein the request includes a set of portions of the named data already possessed by a requester, and wherein the second portion is combined with the first portion based on exclusion from the set of portions of the named data already possessed by the requester.

3. The system of claim 1, wherein each name created for the members of the set of network coded responses include a respective identifier for each portion used to make a corresponding member.

4. The system of claim 1, wherein the adjacent cache record is maintained in a local adjacent cache table that is distinct from a local cache for information centric network data, the local adjacent cache table including a name and a location to an adjacent node with data corresponding to the name.

5. The system of claim 1, wherein, to maintain the adjacent cache record, the controller is to:
parse a request of a combination of named data portions to identify a first named data portion that is new and a second named data portion that is old; and
update the adjacent cache record to include:
a reference to the second named data portion; and
a pointer to a node that sent the request.

6. The system of claim 5, wherein, to maintain the adjacent cache record, the controller is to update the adjacent cache record to include:
a reference to the first named data portion; and
a pointer to a node that responded to the request with data.

7. A method for network coding in an information centric network, the method comprising:
receiving a request for a first portion of first named data;
obtaining a response to the request for the first portion of the first named data;
maintaining an adjacent cache record of cache contents for adjacent nodes, wherein the adjacent cache record is maintained in a local cache by replacing cache contents corresponding to an index with a remote reference to the adjacent node, wherein the adjacent cache record is maintained in a local cache content store (CS) by replacing a CS entry data portion corresponding to an index with a remote reference to the adjacent node, other CS entry data portions containing cached content, wherein the CS is in addition to a forwarding table (FT) used to select an outbound interface to forward received interest packets that name data not found in the CS;
combining the first portion with a second portion for second named data to create a set of network coded responses, wherein the first portion is combined with the second portion in response to a metric determined from the adjacent cache record, the metric being one of estimated network efficiency or compression efficiency;
creating names for members of the set of network coded responses based on a first name for the first portion and a second name for the second portion; and
responding to the request with the set of network coded responses using the names for members of the set of network coded responses.

8. The method of claim 7, wherein the request includes a set of portions of the named data already possessed by a requester, and wherein the second portion is combined with the first portion based on exclusion from the set of portions of the named data already possessed by the requester.

9. The method of claim 7, wherein each name created for the members of the set of network coded responses include a respective identifier for each portion used to make a corresponding member.

10. The method of claim 7, wherein the adjacent cache record is maintained in a local adjacent cache table that is distinct from a local cache for information centric network data, the local adjacent cache table including a name and a location to an adjacent node with data corresponding to the name.

11. The method of claim 7, wherein maintaining the adjacent cache record includes:
parsing a request of a combination of named data portions to identify a first named data portion that is new and a second named data portion that is old; and
updating the adjacent cache record to include:
a reference to the second named data portion; and
a pointer to a node that sent the request.

12. The method of claim 11, wherein maintaining the adjacent cache record includes updating the adjacent cache record to include:
a reference to the first named data portion; and
a pointer to a node that responded to the request with data.

13. At least one non-transitory machine readable medium including instructions for network coding in an information centric network, the instructions, when executed by processing circuitry, cause the processing circuitry to perform operations comprising:
receiving a request for a first portion of first named data;
obtaining a response to the request for the first portion of the first named data;
maintaining an adjacent cache record of cache contents for adjacent nodes, wherein the adjacent cache record is maintained in a local cache by replacing cache contents corresponding to an index with a remote reference to the adjacent node, wherein the adjacent cache record is maintained in a local cache content store (CS) by replacing a CS entry data portion corresponding to an index with a remote reference to the adjacent node, other CS entry data portions containing cached content, wherein the CS is in addition to a forwarding table (FT) used to select an outbound interface to forward received interest packets that name data not found in the CS;
combining the first portion with a second portion for second named data to create a set of network coded responses, wherein the first portion is combined with the second portion in response to a metric determined from the adjacent cache record, the metric being one of estimated network efficiency or compression efficiency;
creating names for members of the set of network coded responses based on a first name for the first portion and a second name for the second portion; and
responding to the request with the set of network coded responses using the names for members of the set of network coded responses.

14. The at least one non-transitory machine readable medium of claim 13, wherein the request includes a set of portions of the named data already possessed by a requester, and wherein the second portion is combined with the first portion based on exclusion from the set of portions of the named data already possessed by the requester.

15. The at least one non-transitory machine readable medium of claim 13, wherein each name created for the members of the set of network coded responses include a respective identifier for each portion used to make a corresponding member.

16. The at least one non-transitory machine readable medium of claim 13, wherein the adjacent cache record is maintained in a local adjacent cache table that is distinct from a local cache for information centric network data, the local adjacent cache table including a name and a location to an adjacent node with data corresponding to the name.

17. The at least one non-transitory machine readable medium of claim 13, wherein maintaining the adjacent cache record includes:
    parsing a request of a combination of named data portions to identify a first named data portion that is new and a second named data portion that is old; and
    updating the adjacent cache record to include:
    a reference to the second named data portion; and
    a pointer to a node that sent the request.

18. The at least one non-transitory machine readable medium of claim 17, wherein maintaining the adjacent cache record includes updating the adjacent cache record to include:
    a reference to the first named data portion; and
    a pointer to a node that responded to the request with data.

19. The system of claim 1, wherein the adjacent cache record is maintained in a local cache by replacing cache contents corresponding to an index with a remote reference to the adjacent node.

20. The system of claim 1, wherein, to maintain the adjacent cache record, the controller is to:
    subscribe to an adjacent cache service of adjacent nodes; and
    update the adjacent cache record with responses to the subscribing.

21. The method of claim 7, wherein the adjacent cache record is maintained in a local cache by replacing cache contents corresponding to an index with a remote reference to the adjacent node.

22. The method of claim 7, wherein maintaining the adjacent cache record includes:
    subscribing to an adjacent cache service of adjacent nodes; and updating the adjacent cache record with responses to the subscribing.

23. The at least one non-transitory machine readable medium of claim 13, wherein the adjacent cache record is maintained in a local cache by replacing cache contents corresponding to an index with a remote reference to the adjacent node.

24. The at least one non-transitory machine readable medium of claim 7, wherein maintaining the adjacent cache record includes:
    subscribing to an adjacent cache service of adjacent nodes; and updating the adjacent cache record with responses to the subscribing.

* * * * *